United States Patent Office 3,322,612
Patented May 30, 1967

3,322,612
LAMINATE ADHERED BY THERMOPLASTIC FIRE - RETARDANT SULFOCHLORINATED LINEAR POLYETHYLENE
Richard Henry Burd, Wilmington, Del., assignor to E. I. du Pont de Nemours and Company, Wilmington, Del., a corporation of Delaware
No Drawing. Filed Sept. 11, 1962, Ser. No. 222,947
5 Claims. (Cl. 161—227)

This invention relates to laminate structures containing a compounded sulfochlorinated polyethylene. More particularly this invention relates to laminate structures wherein at least one of the layers is a compounded sulfochlorinated polyethylene which renders the laminated structure resistant to burning.

A wide variety of plastics and elastomeric materials are used in coating compositions to protect structures from destructive environmental forces. In many cases resistance to burning on exposure to a flame is highly desirable. In order to provide flame-resistance to a coating, it is generally necessary to sacrifice some other highly desirable properties.

It is an object of this invention to provide flame-resistant laminated structures. A further object is to provide laminates having low moisture vapor transmission and good weatherability. Another object is to provide flexible films which are flame resistant and heat sealable and possess good electrical insulating properties. Other objects will appear hereinafter.

The fire resistant laminated structures which accomplish these objects comprise a layer of sulfochlorinated polyethylene containing about 25 percent chlorine and 1 percent sulfur which has been compounded with certain additives and another solid layer in the form of films, sheets, fabrics or non-woven mats. The laminated structures are resistant to burning even though the material comprising one of the layers may burn per se.

More particularly the laminated structure comprises (1) a layer of thermoplastic composition comprising by weight, (a) about 100 parts of sulfochlorinated linear polyethylene containing 23 to 28 percent chlorine and 0.9 to 1.1 percent sulfur, (b) about 4 to 8 parts magnesium oxide, (c) about 30 to 40 parts titanium dioxide pigment, (d) about 30 to 40 parts antimony silico oxide pigment, (e) about 3 to 5 parts tris (2,3-dibromopropyl) phosphate, (f) about 3 to 5 parts polyalkyleneether glycol of molecular weight about 4000, and (g) about 20 to 35 parts soft clay; and (2) a substrate. The substrate can be selected from a great variety of materials such as a solid polyester, polyamide, polyolefin, cotton, asbestos, or glass and the substrate can be in the form of a sheet, a woven fabric, a non-woven mat or a non-woven sheet.

The thermoplastic composition (1) above may be prepared on a rubber roll mill or in a Banbury mixer. On the roll mill, the sulfochlorinated polyethylene is banded out and a rolling bank is formed at a mill roll temperature of about 45° C. The dry ingredients are then added, generally in the following order, magnesium oxide, titanium dioxide, antimony silico oxide, soft clay, tris (2,3-dibromopropyl)phosphate, and polyalkyleneether glycol. The temperature increases during the milling and is around 110–115° C. at the end. About 10–20 minutes is usually required to obtain thorough mixing on the roll mill. At the end of the roll mixing the stock should be rolled and cut a number of times, preferably about ten. Variations of the thermoplastic composition (1) which are outside the prescribed limits will give laminated structures which do not have the desired properties.

In mixing the stock in a Banbury mixer, or other internal mixer, full water-cooling should be applied to the shell and rotors. One-half the sulfochlorinated polyethylene should be added first, followed by all of the dry fillers and one-half the polyalkyleneether glycol. After this has been reasonably well mixed, the balance of the sulfochlorinated polyethylene is added and then the balance of the polyalkyleneether glycol. Mixing in the Banbury will usually require about 4 minutes, and the temperature should not be permitted to rise above about 155° C. at the time of discharge.

The laminate may be formed by several convenient methods. In one process the laminate is formed by calendering an unsupported film of the compounded sulfochlorinated polyethylene onto a sheet, fabric or non-woven construction using conventional equipment. Alternatively, the composition may be skim-coated directly onto the substrate, that is, by forming the sheet on the calender roll. In another embodiment an extruded film may be applied directly to the substrate and the structure then passed through pressure rolls to finish the laminate. The calendering or rolling of the laminates is usually accomplished at an elevated temperature which is easily determined by one skilled in the art.

The sulfochlorinated polyethylene is made from a linear polyethylene, that is, one with few chain branches and that has a specific gravity of about 0.95–0.97. Such polyethylenes are conveniently made using coordination catalysts and are well estabilshed articles of commerce. The sulfur and chlorine contents specified are necessary to provide on the one hand adequate chlorine to assist in the flame-resistant properties and on the other hand are insufficient to cause the laminate to be tacky so that it would tend to stick to itself after being formed.

The dry ingredients must be finely powdered of pigment grade so that they may be uniformly dispersed throughout the composition. The tris(2,3-dibromopropyl) phosphate is incorporated to improve the flame resistance. The polyalkyleneether glycol is added to aid in clean separation from the mill roll, calender, extruder or internal mixer. The proportions of ingredients are essential in providing a composition which will impart flame resistance to the laminate structure.

The second component of the laminate structure may be in a variety of forms and be formed from a number of different solid materials. The material may suitably be in the form of films or sheets, woven fabrics, or non-woven sheets or batts.

Suitable materials are polyesters, polyamides, polyolefins, cotton, asbestos, glass, elastomers and the like. The polyesters are the condensation products of polybasic acids and polyhydric alcohols. Among the wide assortment of polyesters commercially available, polyethylene terephthalate is preferred. It is available commercially as a fiber and hence can be used either as a woven or non-woven fabric. It is available also as a film and is particularly useful in this form.

A variety of polyamides is available also. The nylons made from the condensation of adipic acid with hexamethylenediamine and from caprolactam are typical. It may be used also either as fabric or film.

Polyethylene and polypropylene are representative polyolefins and they are commercially available, usually in the form of film. However, fabrics made from fibers of these polyolefins may be used. Non-woven batts may be also formed from these polyolefins.

Glass fabrics are particularly useful as a component part of the laminate when extreme flame resistance is required.

The laminates of this invention can be comprised of just two layers (one layer of thermoplastic composition (1) and a substrate) or several layers. Thus the thermoplastic composition can form the middle sheet of a laminate surrounded on each side by a substrate layer or vice versa. The laminate can also be formed in a multilayer fashion consisting of several different layers of substrate material and thermoplastic composition. The thermoplastic composition does not necessarily have to be the outer layer of the laminate. The thermoplastic composition (1) is usually about two mils thick but can vary depending on the particular use for the laminate being prepared. Laminates are given in the following examples that have a layer of the thermoplastic composition of up to ten mils thick. The thermoplastic composition gives added strength to the laminate and acts as a vapor barrier and an abrasion resistor.

In addition to the above materials which are used in this invention for the second component, other materials may be used in conjunction therewith. Asbestos may be used in combination with a material which acts as a binder to hold the asbestos in sheet form; for example, asphalt or coal tar. Polymers such as polyurethanes, polychloroprene, butadienestyrene copolymers, polybutadiene and polyisobutylene-butadiene copolymers may be used also to bind the fibers of non-woven batts or fabrics. In some instances it may be desirable to use an adhesive between the layers of the laminates. A wide variety of adhesives compatible with sulfochlorinated polyethylene, usually compositions containing polymeric substances, are readily available; and it is within the skill of the art to select suitable adhesives for specific substrates.

The laminates of this invention have many useful applications such as insulation for electrical wires, covering for pipe insulation, cable jacketing, insulation vapor barriers, fire resistant wall covering and fire resistant partitions.

The following examples will better illustrate the nature of the present invention; however, the invention is not intended to be limited to these examples. Parts are by weight unless otherwise indicated.

EXAMPLES

*Compounded Stock A*

Into an internal mixer with water cooling on the shell and rotors is charged

| | Parts |
|---|---|
| Sulfochlorinated linear polyethylene containing 26% chlorine and 1% sulfur | 50 |
| Magnesium oxide | 4 |
| Rutile titanium dioxide pigment | 35 |
| Antimony silico oxide pigment | 35 |
| Soft clay | 25 |
| Tris(2,3-dibromopropyl)phosphate | 3 |
| Polyethylene ether glycol (having an average molecular weight of 4000) | 1.5 |

The charge is then mixed for two minutes at which time it becomes homogeneous and the temperature rises to about 100°–110° C. There is then added to the mass an additional 50 parts of the sulfochlorinated polyethlylene and mixing is then continued further ¾ minute and the temperature reaches 138° C. Then an additional 1.5 parts of the polyethylene ether glycol is added and mixing is continued until the temperature of the mass reaches 150° C. in about ½–¾ minute. The charge is then dropped to a roll mill and sheeted off.

EXAMPLE 1

A portion of Compounded Stock A is put on a rubber roll mill and milled until it sheets at roll temperature of about 95–100° C. It is then transferred to a 3-roll calender. The calender rolls are from top to bottom at 138±5° C., 121±5° C., and 77±5° C., respectively. The stock is skim-coated onto a glass mesh woven fabric (Hess-Goldsmith—10) which is fed into the calender between rolls 2 and 3 at ambient temperature as the bottom part of the laminate. The coating of Stock A is 8 mils thick. The laminate is then rolled up on a windup roll.

The laminate is tested for flame resistance according to Method 5902 of Federal Specification CCC-T-191-6.

| | |
|---|---|
| Flame time ___seconds__ | 1.1 |
| Glow time ___second__ | 0.2 |
| Char length ___inch__ | 0.22 |

Accelerated aging tests in the wet weatherometer for 1000 hours showed no discoloration.

EXAMPLE 2

By the procedure of Example 1 a portion of Compounded Stock A is skim-coated onto a non-woven polyethylene fabric (2 oz. per sq. yd.) to a thickness of 10 mils.

The laminate is tested for flame resistance in accordance with ASTM E–84–60–T test. The flame rating is 30. This is well under the acceptable minimum value of 50 for Class 1 wire insulation jacketing.

EXAMPLE 3

By the procedure of Example 1 a portion of Compounded Stock A is skin-coated onto cotton sheeting (2.1 oz. per sq. yd.). This is useful as insulation pipe covering and the flame resistance is qualitatively equivalent to the product of Example 2.

EXAMPLE 4

By the procedure of Example 1 a portion of Compounded Stock A is skim-coated onto a polyethylene terephthalate film of 1 mil thickness. The sulfochlorinated coating is 2 mils thick.

This laminate does not burn when held in the flame of a match.

This laminate is particularly useful for low voltage wire insulation. Since it is heat sealable, the wire or wires may be merely laid between two sheets of laminates with the sulfochlorinated polyethylene sides in and then heated to form a strip of insulated wire with an external polyester surface.

EXAMPLE 5

By the procedure of Example 1 a portion of Compounded Stock A is skim-coated onto a polyamide fabric (nylon 66; 2.3 oz. per sq. yd.). The fabric is pretreated with a sulfochlorinated polyethylene cement. The formulation of the cement is as follows:

| | Parts |
|---|---|
| Sulfochlorinated high pressure polyethylene (branched) containing 29% chlorine and 1.4% sulfur | 100 |
| Magnesium oxide | 4 |
| Rutile titanium dioxide | 35 |
| Antimony silico oxide pigment | 35 |
| Soft clay | 25 |
| Polyethylene of average molecular weight about 1500 | 1.5 |
| Tris(2,3-dibromopropyl)phosphate | 3 |
| Solution of methylene bis(4-phenylisocyanate) in chlorobenzene (50%) | 40 |
| Toluene | 600 |

A coating approximately 1.5 mils thick is applied to the nylon fabric and dried in a circulating air oven at 88° C. for 5 minutes.

The coating of Compounded Stock A on the polyamide is 10 mils thick. The laminate does not burn when held in the flame of a match.

EXAMPLE 6

By the procedure of Example 1, except that the bottom roll of the calender is at 37–40° C., a portion of Compounded Stock A is skim-coated onto a neoprene-bound asbestos felt of 14 mils thickness. The sulfochlorinated polyethylene coating composition is 8 mils thick. The moisture vapor transmission as determined by TAPPI Specification T-448-49 is 0.65 perm. (An acceptable value for insulation coating is 1.0 perm or lower.)

What I claim is:
1. In a structure wherein a solid substrate layer of polyethylene terephthalate, polyolefin, polyamide or cotton is laminated to a coating layer of a sulfochlorinated polyethylene containing, per 100 parts of the latter, about 4 to 8 parts of magnesium oxide, about 30 to 40 parts of titanium dioxide, about 3 to 5 parts of polyalkyleneether glycol having a molecular weight of about 4,000, and about 20 to 35 parts of soft clay, *the improvement* wherein (I) said sulfochlorinated polyethylene is linear and thermoplastic containing from 23% to 28% chlorine and 0.9% to 1.1% sulfur, and (II) the following combination of ingredients is also present in said coating layer: about 30 to 40 parts of antimony silico oxide pigment, and about 3 to 5 parts of tris(2,3-dibromopropyl)phosphate.

2. A laminate as described in claim 1 wherein said substrate is polyethylene terephthalate.

3. A laminate as described in claim 1 wherein said substrate is polyolefin.

4. A laminate as described in claim 1 wherein said substrate is polyamide.

5. A laminate as described in claim 1 wherein said substrate is cotton.

References Cited

UNITED STATES PATENTS

| | | | |
|---|---|---|---|
| 2,577,281 | 12/1951 | Simon et al. | 161—190 X |
| 2,854,425 | 9/1958 | Boger et al. | 260—33.6 |
| 3,034,939 | 5/1962 | Newkirk et al. | 161—255 X |
| 3,060,078 | 10/1962 | Atwell | 156—333 X |
| 3,179,554 | 4/1965 | Gladding et al. | 161—216 |
| 3,214,394 | 10/1965 | Schoepfle et al. | 260—2.5 |

OTHER REFERENCES

Dupont Co., Hypalon Report No. 6, April 1961, A. L. Moran, 8 pp.

Hypalon S-2-A New Elastomer, Warner, R. R., in Rubber Age,, Vol. 17, No. 2, pp. 205–221.

Polyesters and Their Applications, Bjorksten, J., et al., pp. 96, 140 and 160, Reinhold Publishing Corp., New York, 1956.

EARL M. BERGERT, *Primary Examiner.*

CLIFTON B. COSBY, *Examiner.*